(12) United States Patent
Jänicke

(10) Patent No.: US 7,692,880 B2
(45) Date of Patent: Apr. 6, 2010

(54) GAS-TIGHT ENCAPSULATING ENCLOSURE FOR A POWER TRANSMISSION DEVICE

(75) Inventor: Lutz-Rüdiger Jänicke, Mahlow (DE)

(73) Assignee: Siemens Aktiengesellschaft, Munich (DE)

( * ) Notice: Subject to any disclaimer, the term of this patent is extended or adjusted under 35 U.S.C. 154(b) by 122 days.

(21) Appl. No.: 11/994,355

(22) PCT Filed: Jun. 27, 2006

(86) PCT No.: PCT/EP2006/063579

§ 371 (c)(1),
(2), (4) Date: Dec. 31, 2007

(87) PCT Pub. No.: WO2007/003529

PCT Pub. Date: Jan. 11, 2007

(65) Prior Publication Data

US 2008/0204903 A1    Aug. 28, 2008

(30) Foreign Application Priority Data

Jun. 30, 2005    (DE) .................. 10 2005 031 360

(51) Int. Cl.
*G02B 27/00* (2006.01)
(52) U.S. Cl. ....................................... 359/810; 359/513
(58) Field of Classification Search ................. 359/513, 359/810
See application file for complete search history.

(56) References Cited

U.S. PATENT DOCUMENTS 6,501,572 B1 * 12/2002 Poth et al. .................. 361/605
6,697,247 B1    2/2004 Meinherz et al.

FOREIGN PATENT DOCUMENTS

| DE | 2553898 A1 | 6/1977 |
|---|---|---|
| DE | 3542550 A1 | 11/1986 |
| DE | 9303412 U1 | 5/1993 |
| DE | 19653683 C1 | 6/1998 |
| DE | 29806211 U1 | 6/1998 |
| DE | 19715780 A1 | 10/1998 |
| EP | 0122595 A1 | 10/1984 |
| EP | 0615130 A2 | 9/1994 |
| EP | 0875972 A1 | 11/1998 |
| EP | 1066643 B1 | 2/2002 |
| JP | 53116443 A | 10/1978 |
| JP | 07226131 A | 8/1995 |

OTHER PUBLICATIONS

German Search Report dated Feb. 24, 2006.
International Search Report dated Oct. 19, 2006.

* cited by examiner

*Primary Examiner*—Joseph Martinez
(74) *Attorney, Agent, or Firm*—Laurence A. Greenberg; Werner H. Stemer; Ralph E. Locher

(57) ABSTRACT

A gas-tight enclosure casing surrounds an enclosure casing interior space. A sight glass is situated on the enclosure casing and enables an area located inside the enclosure casing to be monitored. The sight glass is provided in the form of a lens system. An area to be monitored is focused upon a sensor array of an optical sensor via the lens system.

9 Claims, 3 Drawing Sheets

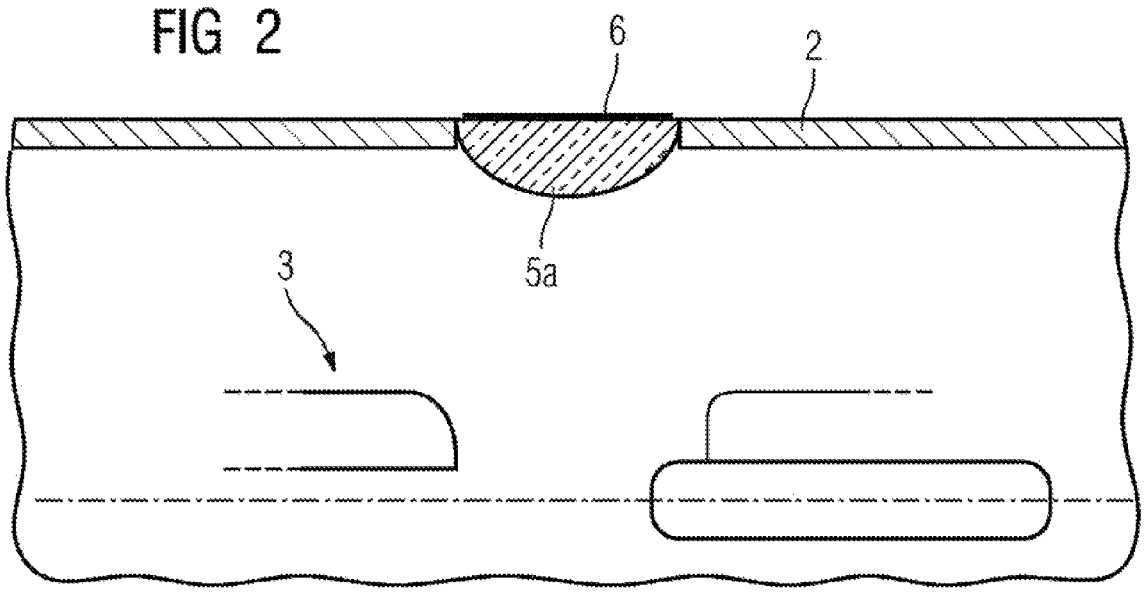
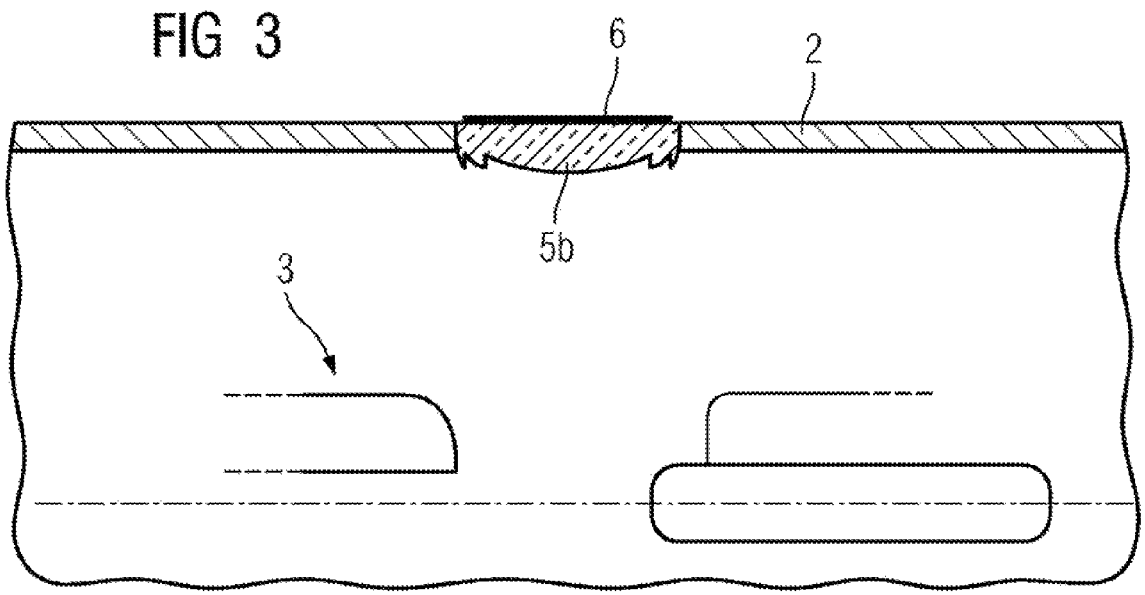

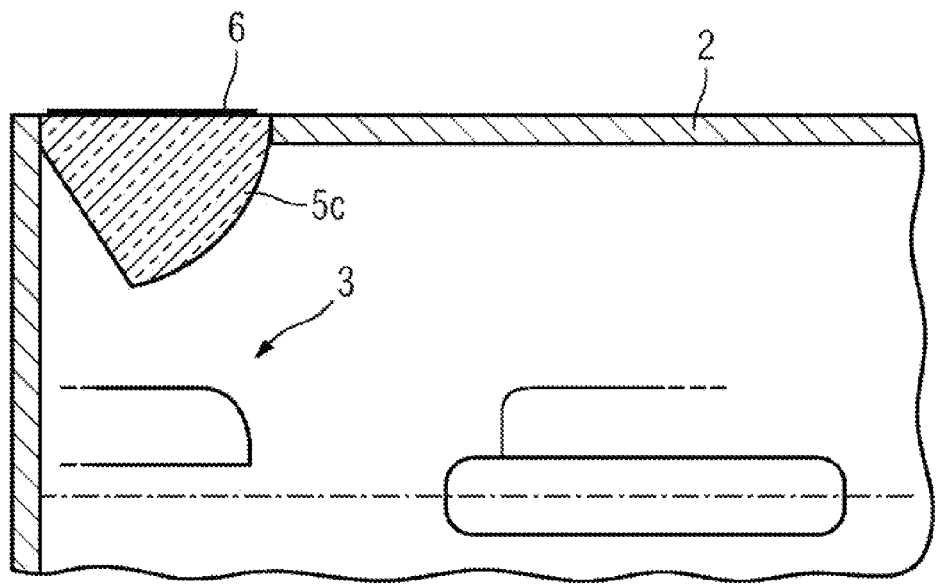
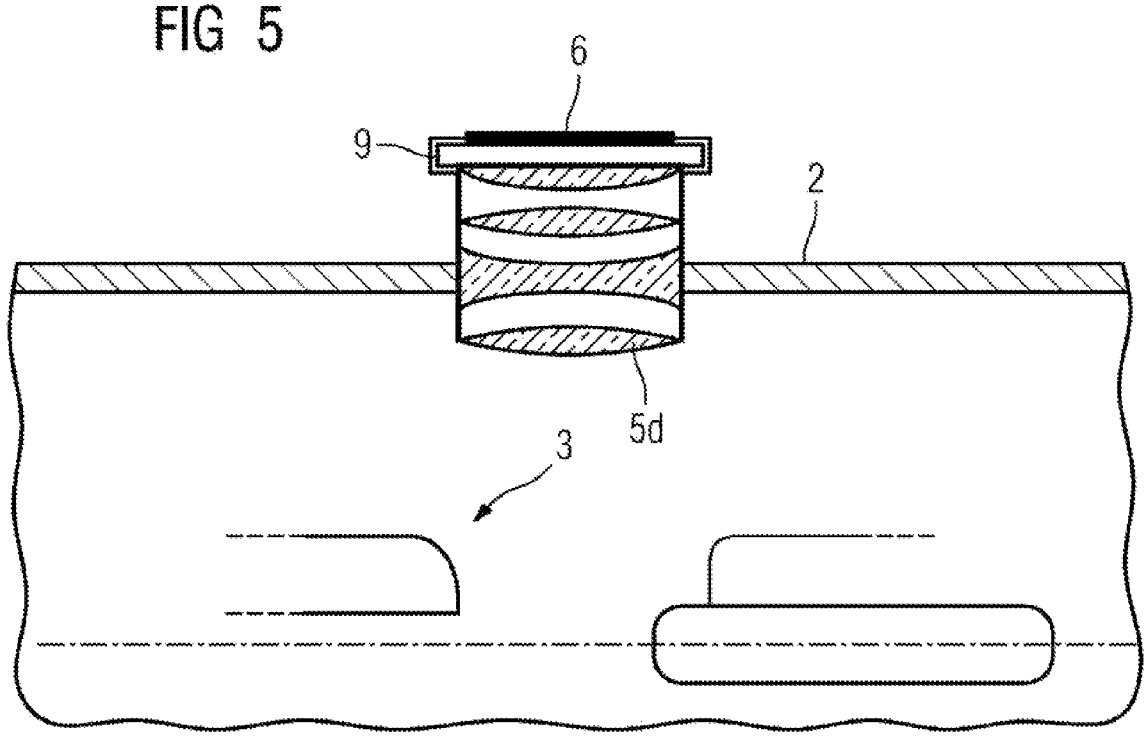

GAS-TIGHT ENCAPSULATING ENCLOSURE FOR A POWER TRANSMISSION DEVICE

BACKGROUND OF THE INVENTION

Field of the Invention:

The invention relates to a gas-tight encapsulating enclosure having a sight glass for monitoring an encapsulating enclosure internal area for a power transmission device.

By way of example, utility model DE 298 06 211 U1 discloses a gas-tight encapsulating enclosure such as this. In this document, a combined isolating/grounding switch is arranged in an encapsulating housing internal area and has movable contact pieces. Sight glasses are incorporated in the encapsulating housing in order to identify the position of the movable contact pieces. The position of the movable contact pieces can be seen visually through these sight glasses.

Normally, the gas-tight encapsulating enclosure is manufactured from material through which optical radiation cannot pass. The encapsulating enclosure internal area is therefore shadowed. It is therefore possible to observe areas to be monitored in the encapsulating enclosure internal area only with difficulty.

BRIEF SUMMARY OF THE INVENTION

The invention is therefore based on the object of designing a gas-tight encapsulating housing of the type mentioned initially such that areas to be monitored in the encapsulating housing internal area can be monitored more objectively and more easily.

According to the invention, the object is achieved in the case of a gas-tight encapsulating enclosure of the type mentioned initially in that the sight glass is in the form of a lens system.

The use of a lens system allows the area to be monitored to be seen more clearly. This can be done, for example, by emphasizing the area to be monitored in a particular manner in comparison to the other areas, which are likewise located in the area which can be seen through the sight glass. The area to be monitored can be specially magnified for this purpose. However, it is also possible to provide for the area to be monitored to be specially emphasized by means of a suitable marking within the lens system or by special coloring of the lens system. The use of a lens system also makes it possible to monitor the area to be monitored in encapsulating enclosure internal areas in which the lighting is poor. In this case, optical radiation can be specifically deflected or focused by the lens system. The expression optical radiation means electromagnetic radiation which covers a wavelength range from about 100 nm to 1 mm. In particular, this is the optical radiation known by the expressions UV radiation, visible light and infrared radiation. Furthermore, the use of the lens system reduces the additionally required installation area on the encapsulating enclosure. Gas-tight encapsulating enclosures often surround gases or liquids which are at a higher pressure than the surrounding area. For this reason, the encapsulating enclosures have relatively strong walls. The use of a lens system makes it possible to make use of the physical space available within a wall for deflection or focusing of the optical radiation. This avoids larger fittings in the interior of the encapsulating enclosure, or else on the outer circumference of the encapsulating enclosure.

An advantageous refinement can also be provided by one lens of the lens system closing an opening in the encapsulating enclosure such that it is gas-tight.

The lens of the lens system is manufactured from a suitable material which allows optical radiation to pass through. A material such as this may, for example, be a glass, a salt, a plastic or similar gas-tight material. In this case, it is possible to provide for the lens to have a concave lens, a convex lens, or a combination of concave and convex sections.

When choosing a lens with a circular base area, this results in a shape which is comparatively resistant to pressure so that the lens can be used to close an appropriately shaped opening in the encapsulating enclosure such that it is both gas-tight and pressure-resistant. For this purpose, for example, the lens may be held in a suitable socket and, for example, the socket may be placed on a flange which surrounds the opening. Elastic sealing elements can be used for sealing. The use of a lens to close the opening has the advantage that this results in defined contact points on the encapsulating enclosure, which are easy to seal. Furthermore, the lens allows corresponding deflection of the beam path from the area to be monitored in the encapsulating enclosure internal area to outside the gas-tight encapsulating enclosure, and vice versa.

A further advantageous refinement makes it possible to provide for a sensor array of a sensor for detection of optical radiation to face the lens system, with the sensor array being arranged outside the encapsulating enclosure internal area.

The arrangement of a sensor array outside the encapsulating enclosure internal area makes it possible in a simple manner to couple the sensor to further control and management devices by means of cables without having to break through a gas-tight wall of the encapsulating enclosure. The sensor that is used may be chosen variably from a wide range of commercially available sensors. Furthermore, the integration of the lens system in the gas-tight wall ensures that optical radiation can pass through the wall itself without any problems. The lens system itself may have one or more optical lenses. If the lens system is chosen appropriately, it is possible to use a sensor which itself has focusing devices for optical radiation. For example, it is possible to use a semiconductive chip which detects optical radiation and converts it to electrical pulses. Chips such as these are commercially available, for example, and of the designation CCD chip. The chip then acts as a sensor array for optical radiation, and images the area to be monitored in the encapsulation internal area.

The separation of the lens system and sensor also has the advantage that, during maintenance work, the sensor can easily be replaced, and the lens system remains as part of the gas-tight wall in the encapsulating enclosure itself. In consequence, there is no need to enter the encapsulating enclosure internal area. This precludes any dirt or damage which may occur during this process. Because of the progress of technical development, it can be assumed that, once the sensor becomes worn, an identical sensor will no longer be available and that a replacement must be obtained from the range of sensors which are then available. Since the operation of the encapsulating enclosure itself is not influenced by the sensor, a matching apparatus can be arranged on the encapsulating enclosure in order to allow a different sensor to be used.

In comparison to complete arrangement of a sensor in the encapsulating enclosure internal area, the solution according to the invention also has the advantage that the encapsulating enclosure internal area does not have additional components fitted to it. In gas-tight encapsulating enclosures for high-voltage switching devices and high-voltage transmission devices, the internal areas are very compact, and high electrical field strengths occur at individual points. When installing a sensor in the encapsulating enclosure internal area, there is a risk of field strength each being additionally increased, and of the operational reliability of the power transmission device being reduced.

Typical sensors for detection of optical radiation are, for example, electronic cameras. Simple cameras have the disadvantage, however, that the optics which are mounted on the cameras have only a limited light intensity, because of their compact design. The coverage of an area in the encapsulating enclosure internal area through a sight glass additionally reduces the quality of the images which can be produced. By way of example, the use of a lens system makes it possible to dispense with the use of optics on the sensor. In fact, if a sight glass is in the form of a lens system, the optics can themselves be integrated in the encapsulating enclosure. The optical rays can in fact be deflected and focused in the area of the enclosure wall. An appropriate sensor array is arranged outside the encapsulating enclosure, for example a semiconductor chip on which an image of the area of the encapsulating enclosure interior to be monitored is projected. This improves the quality of the images that are produced.

It is also possible to provide for the lens system to have an associated sensor only at times, for example during start-up phases or when there is some other specific requirement. When there is no such requirement, the lens system can be used to manually view the monitoring area in the encapsulation internal area. In comparison to flat sight glasses, areas of interest can be deliberately magnified by means of a lens in the lens system. For retention, the sensor may, for example, be mounted in an enclosure shell, which is fixed over the lens system.

It is also advantageously possible to provide for the sensor array to be attached to the lens system.

Attaching the sensor array to the lens system makes it possible to align the sensor field with the optical axis of the lens system more accurately. Vibration of other enclosure sections can thus only with difficulty cause relative movement between the sensor array and the lens system.

It is advantageously also possible to provide for the lens system to have at its end remote from the encapsulating enclosure internal area, a body through which optical radiation can pass and which has a flat surface with respect to which the sensor array is aligned approximately parallel.

The choice of a sealing body with a flat surface allows simple adjustment of the sensor array on the lens system. In a simple case, sensor arrays of semiconductor chips are approximately planar. A parallel alignment can be produced by means of appropriate auxiliary frames. In a simple case, the semiconductor chip may, for example, be placed directly on the flat surface of the lens system, thus preventing ingress of foreign bodies into the gap which is formed between the light-sensitive sensor surface of the semiconductor chip and the flat surface of the lens system.

It is also possible to provide for the translucent body to advantageously have a spherically curved surface on a side facing away from the flat surface.

A spherically curved surface such as this may, for example, be a concave or convex cup-like dome. Refinements such as these can be used advantageously when, for example, it is necessary to cover a wide area in the encapsulating enclosure internal area. In this case, distortion is also accepted, in order to cover the area by means of a single sensor. The body may also be composed of more than one piece. For example, a plurality of lenses can be encapsulated together.

A further advantageous refinement makes it possible to provide for the lens system to focus a coverage area in the encapsulating enclosure internal area on the sensor array.

Appropriate focusing of the lens system on the sensor array ensures sharp imaging of the coverage area in the encapsulating enclosure internal area. In this case, it is possible to provide for the lens system to have a fixed focus setting. Furthermore, however, it is also possible to provide for the lens system to have the capability of active focusing. By way of example, this makes it possible to monitor different areas, which are physically staggered one behind the other and are located in the coverage area of the lens system.

A further advantageous refinement makes it possible to provide for the lens system to have a prism.

A prism allows a beam path to be deflected. It is therefore possible to arrange the lens system in areas of the encapsulating enclosure from which it is not possible to directly view the area to be monitored in the encapsulating enclosure internal area. Furthermore, a prism can also be used to split the optical radiation, thus allowing simple evaluation of individual wavelength ranges. It is possible to provide for one or more prism surfaces to be at least partially reflective. It is also possible to use a plurality of prisms in order to cover different areas in the encapsulating enclosure internal area.

A further advantageous refinement makes it possible to provide for the lens system to have a Fresnel lens.

A Fresnel lens makes it possible to restrict the installation depth of the lens system. Powerful lenses can be used, even though they have only a small physical depth. Fresnel lenses are therefore particularly suitable for use in compact gas-tight encapsulating enclosures of a high-voltage circuit breaker or of an area in a high-voltage switchgear assembly.

The invention will be described in more detail in the following text with reference to exemplary embodiments, and is illustrated schematically in a drawing, in which:

BRIEF DESCRIPTION OF THE SEVERAL VIEWS OF THE DRAWING

FIG. 2 shows a detail view of a lens system with a focusing lens, FIG. 3 shows a detail view of a lens system with a Fresnel lens, FIG. 4 shows a detail view of a lens system with a prism, and FIG. 5 shows a lens system which is formed from a multiplicity of optical lenses.

DESCRIPTION OF THE INVENTION

Figure 1:
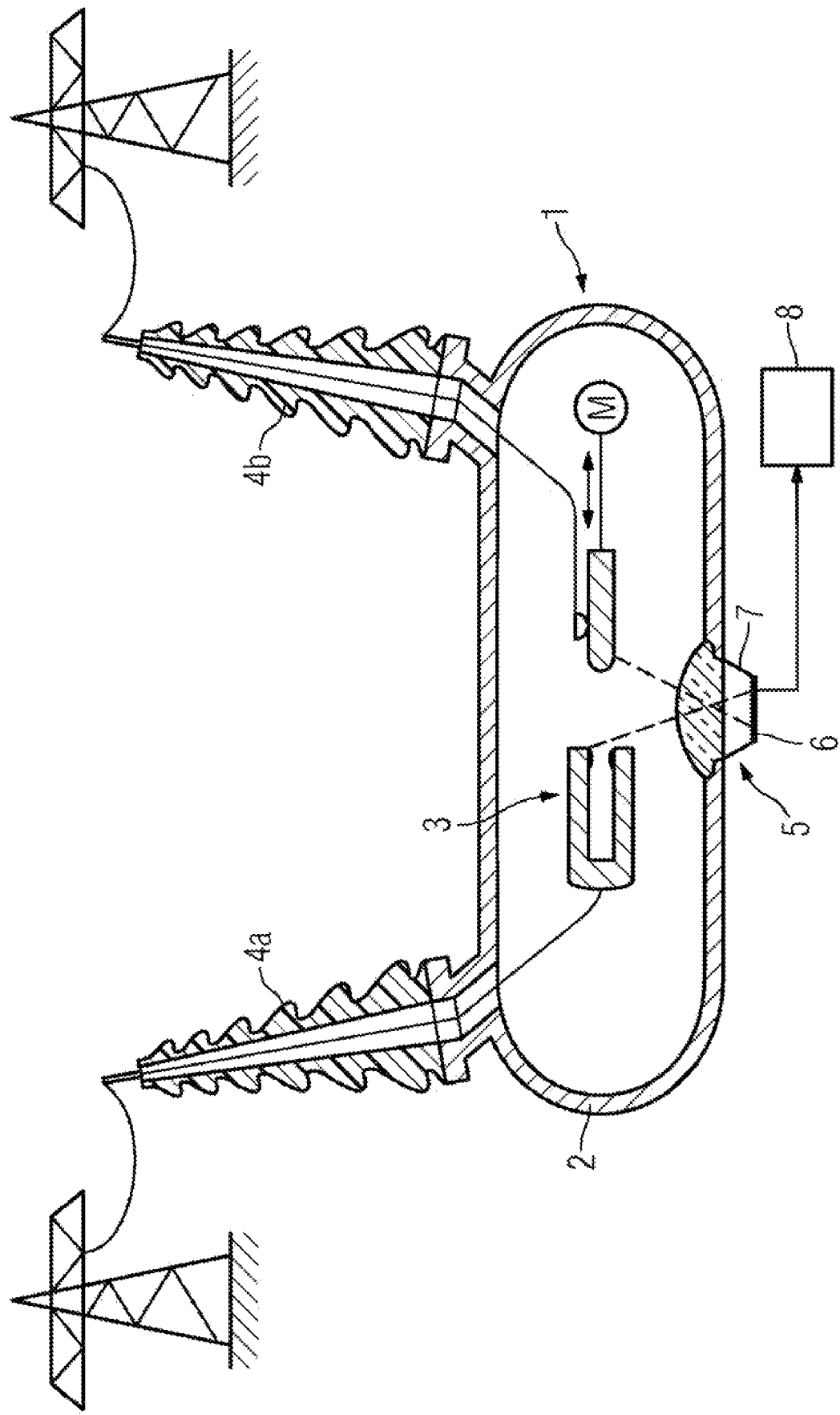
FIG. 1 shows a section through a high-voltage circuit breaker having a lens system.

By way of example, FIG. 1 shows a high-voltage circuit breaker 1. The high-voltage circuit breaker 1 is a so-called dead-tank circuit breaker, that is to say a gas-tight encapsulating enclosure 2 formed essentially from electrically conductive material surrounds one or more interrupt units 3. The interrupt units 3 are arranged in the encapsulating enclosure internal area and each have a contact point, which has contact pieces which can move relative to one another. The encapsulating enclosure internal area is filled with a pressurized fluid, such as $SF_6$, $N_2$ or insulating oil. In order to include the contact pieces, which can move relative to one another, in an electrical power transmission system, outdoor bushings 4a, 4b are arranged on the gas-tight encapsulating enclosure 2. The outdoor bushings 4a, 4b allow electrical cables, which are kept insulated from the gas-tight encapsulating enclosure 2, to be passed through in a gas-tight manner. However, the invention can also be used for other electrical power transmission devices such as gas-insulated pipelines (GIL) and gas-insulated switchgear assemblies (GIS).

The major parts of the gas-tight encapsulating enclosure 2 are formed from a metal through which optical radiation cannot pass. In order to monitor the position of the contact pieces, which can move relative to one another, of the interrupter units 3, a lens system 5 is inserted in the wall of the gas-tight encapsulating enclosure 2. In the present case, the lens system is formed from a focusing lens, which is formed from a gas-tight material through which visible light can pass, such as glass. The lens system 5 is imbedded in a socket and is designed to be gas-tight and pressure-resistant. Depending on the requirement, the switching state of the interrupter unit 3 can be monitored via the lens system 5. Manual monitoring can be carried out, for example, by an operator from a utility company. However, it is also possible to provide for the switching state of the interrupter unit 3 to be monitored as required or continuously by means of an optical sensor 6. The optical sensor 6 is aligned with the optical axis of the lens system 5 by means of an attachment apparatus 7. By way of example, the attachment apparatus 7 may be mounted on those sections of the gas-tight encapsulating enclosure 2 through which optical radiation cannot pass, and/or may be attached to the lens system 5 itself. In a simple case, it is possible, for example, to provide for the optical sensor 6 to be in the form of a semiconductive chip whose optically sensitive sensor surface faces the lens system and is arranged at a short distance from the lens system 5, or resting directly on the lens system 5. The electrical pulses which are produced by the optical sensor 6 are sent, for example, to a processing device 8. The data can be passed from the processing device 8 to further control devices, management devices, storage devices, etc.

FIGS. 2, 3, 4 and 5 each show details of a gas-tight encapsulating enclosure 2, with the configuration of the respective lens system varying. FIGS. 2, 3, 4, and 5 each show a section of the gas-tight encapsulating enclosure 2. Furthermore, details of contact pieces, which can move relative to one another, of a contact point in an interrupter unit 3 are also shown in each case.

The lens system 5a of the exemplary embodiment illustrated in FIG. 2 is formed from a focusing lens which has a spherically curved surface on the side facing the interrupter unit 3. The lens system 5a has a flat surface on the side facing away from the encapsulating enclosure internal area. The image plane of the lens system 5a lies on the boundary surface of the lens system 5a, facing away from the encapsulating enclosure internal area. The sensor array of an optical sensor 6 is placed on the flat surface. In this case, it can be placed in such a way that the sensor array of the optical sensor 6 makes direct contact with the flat surface of the lens system 5a. Alternatively, however, it is also possible to provide by means of appropriate spacers, for example a frame or other mounting rack, for a distance to be provided between the flat surface of the lens system 5 and a sensor array of the optical sensor 6. In a simple case, the optical sensor 6 may, for example, be fixed by means of an externally produced force.

The difference between the exemplary embodiment shown in FIG. 2 and FIG. 3 is that a Fresnel lens is used in the lens system 5b. Because of its intrinsic physical design, the Fresnel lens projects only slightly into the encapsulating enclosure internal area.

FIG. 4 shows the use of a prism on a lens system 5c. The beam path is deflected via the incline prism surface, so that the sensor 6 also covers areas which are not arranged directly opposite. In addition, the prism can be combined with spherical curvature.

FIG. 5 shows a more complex lens system 5d. The lens system 5d comprises a multiplicity of convex and concave lenses. The combination of a plurality of lenses makes it possible to deliberately increase the presentation quality of the area to be covered. Furthermore, an arrangement such as this offers the advantage that the coverage area can be focused variably. This can be done, for example, by varying the position of some or all of the lenses in the lens system 5d, or by varying the curvature of the lenses themselves, for example by application of an electrical field.

The various focusing points mean that it is possible not only to monitor the contact pieces of the interrupter unit 3 but also, for example, to monitor sections located further away in which, for example, further devices to be monitored are arranged.

The optical sensor 6 of the lens system 5d illustrated in FIG. 5 is attached to the lens system 5d by means of a mounting apparatus 9. In this case, the mounting apparatus 9 may be designed such that the optical sensor 6 can be moved, pivoted or else tilted relative to the lens system 5d. However, it is also possible to provide for the mounting apparatus 9 to be mounted on those sections of the gas-tight encapsulating enclosure 2 through which optical radiation cannot pass. By way of example, enclosure shells, which protect the sensor 6, may be used as a mounting apparatus 9.

In addition, when using a plurality of lenses on the lens system 5d, a lens, in the present example a concave lens, can be used to form a gas-tight junction with those areas of the gas-tight encapsulating enclosure 2 which surround the lens system 5d. However, it is also possible to provide for a plurality of lenses of a lens system to jointly provide sealing for an opening in that section of the gas-tight encapsulating enclosure 2 through which optical radiation cannot pass. Adequate seals must also be provided in a corresponding manner on the boundary surfaces.

In the case of the lens system 5d illustrated in FIG. 5, some of the lenses are located outside the encapsulating internal area. One lens is located in the encapsulating internal area, and the concave lens forms a boundary between the encapsulating enclosure internal area and a volume surrounding the encapsulating enclosure 2.

In addition to the use of the invention for electrical power transmission devices, further encapsulating enclosures may also be considered. For example, oil/gas pipelines, storage tanks, etc. can be equipped in this way.

The invention claimed is:

1. A gas-tight encapsulating enclosure, comprising:
    an enclosure body having an encapsulated enclosure internal area for a power transmission device; and
    a sight glass for monitoring said encapsulated enclosure internal area, said sight glass being a lens system;
    said enclosure body having an opening formed therein; and
    said sight glass being inserted into said opening in said enclosure body and closing said opening in said enclosure body in a gas-tight manner.

2. The gas-tight encapsulating enclosure according to claim 1, wherein:
    said lens system has at least one lens closing said opening in said enclosure body in a gas-tight manner.

3. The gas-tight encapsulating enclosure according to claim 1, further comprising a sensor having a sensor array for detecting optical radiation and facing said lens system, said sensor array being disposed outside of said encapsulated enclosure internal area.

4. The gas-tight encapsulating enclosure according to claim 3, wherein said sensor array is attached to said lens system.

5. The gas-tight encapsulating enclosure according to claim 3, wherein said lens system has, at its end remote from said encapsulated enclosure internal area, a body through which the optical radiation can pass, said body having a flat surface with respect to which said sensor array is aligned approximately parallel.

6. The gas-tight encapsulating enclosure according to claim 5, wherein said body is a translucent body having a spherically curved surface on a side facing away from said flat surface.

7. The gas-tight encapsulating enclosure according to claim 3, wherein said lens system focuses a detection area in said encapsulated enclosure internal area on said sensor array.

8. The gas-tight encapsulating enclosure according to claim 1, wherein said lens system has a prism.

9. The gas-tight encapsulating enclosure according to claim 1, wherein said lens system has a Fresnel lens.

* * * * *